United States Patent
Lombardi et al.

(10) Patent No.: US 9,719,738 B2
(45) Date of Patent: Aug. 1, 2017

(54) APPARATUS AND METHOD FOR APPLYING MAGNETIC FIELDS TO FLUID FLOWS

(71) Applicant: HydroFlux Technology, LLC, Santa Monica, CA (US)

(72) Inventors: Michael R. Lombardi, Los Angeles, CA (US); Neil B. Morley, Santa Monica, CA (US)

(73) Assignee: Hydroflux Technology, LLC, Santa Monica, CA (US)

( * ) Notice: Subject to any disclaimer, the term of this patent is extended or adjusted under 35 U.S.C. 154(b) by 464 days.

(21) Appl. No.: 14/206,498

(22) Filed: Mar. 12, 2014

(65) Prior Publication Data

US 2014/0263077 A1    Sep. 18, 2014

Related U.S. Application Data

(60) Provisional application No. 61/781,898, filed on Mar. 14, 2013.

(51) Int. Cl.
 *F28F 19/01* (2006.01)
 *B03C 1/033* (2006.01)
 (Continued)

(52) U.S. Cl.
 CPC .............. *F28F 19/01* (2013.01); *B03C 1/034* (2013.01); *B03C 1/0332* (2013.01); *B03C 1/286* (2013.01);
 (Continued)

(58) Field of Classification Search
 CPC .......... F28F 19/01; B03C 1/286; B03C 1/288; B03C 1/0332; B03C 2201/18;
 (Continued)

(56) References Cited

U.S. PATENT DOCUMENTS

| | | | |
|---|---|---|---|
| 4,894,153 A | 1/1990 | Shirdavant | |
| 5,238,558 A * | 8/1993 | Curtis | C02F 1/482 |
| | | | 123/538 |

(Continued)

FOREIGN PATENT DOCUMENTS

| | | |
|---|---|---|
| CN | 201704111 U | 1/2011 |
| CN | 201704112 U | 1/2011 |

(Continued)

OTHER PUBLICATIONS

International Search Report and Written Opinion from International Application No. PCT/US2014/028239 dated Jul. 22, 2014.

(Continued)

*Primary Examiner* — David A Reifsnyder
(74) *Attorney, Agent, or Firm* — Alston & Bird LLP

(57) ABSTRACT

Devices and methods are provided for in-line water treatment using strong magnetic fields to influence corrosion, separate toxins, suppress bacteria and bio-fouling, as well as inhibit or greatly reduce mineral scaling due to fluid flow in or around equipment components. For example, a device is provided for applying a magnetic field to a portion of tubing through which a fluid flow, such as water, is conveyed. The device includes a number of links joined together via detachable pivoting connections, such that links may be removed and/or links may be added, thereby allowing a diameter of the device to be adjusted so as to accommodate larger or smaller piping, as necessary, for retrofitting applications. The use of magnetic treatment of fluids such as water may allow extended cycles of operation with higher concentration of mineral salts without the use of chemical scaling suppressants.

16 Claims, 8 Drawing Sheets

(51) Int. Cl.
*B03C 1/28* (2006.01)
*C02F 1/48* (2006.01)
*B03C 1/034* (2006.01)
*C02F 103/02* (2006.01)

(52) U.S. Cl.
CPC ............. *B03C 1/288* (2013.01); *C02F 1/482* (2013.01); *B03C 2201/18* (2013.01); *C02F 1/485* (2013.01); *C02F 2103/02* (2013.01); *C02F 2103/023* (2013.01); *C02F 2201/004* (2013.01); *C02F 2201/007* (2013.01); *C02F 2201/48* (2013.01); *C02F 2303/04* (2013.01); *C02F 2303/08* (2013.01); *C02F 2303/20* (2013.01); *C02F 2303/22* (2013.01)

(58) Field of Classification Search
CPC   C02F 1/482; C02F 2303/22; C02F 2103/023; C02F 2303/20; C02F 2201/48; C02F 1/485; C02F 2303/08; C02F 2201/007; C02F 2303/04
See application file for complete search history.

(56) References Cited

U.S. PATENT DOCUMENTS

| | | | |
|---|---|---|---|
| 5,534,156 A * | 7/1996 | Sanderson | ............. C02F 1/481 210/695 |
| 5,714,063 A | 2/1998 | Brunsting | |
| 5,993,749 A | 11/1999 | Adams | |
| 6,171,504 B1 | 1/2001 | Patterson | |
| 6,755,968 B2 * | 6/2004 | Sato | ........................ B01J 19/087 210/222 |
| 8,354,030 B1 | 1/2013 | Schuh | |
| 2002/0056679 A1 | 5/2002 | Sato | |
| 2008/0136191 A1 | 6/2008 | Baarman et al. | |

FOREIGN PATENT DOCUMENTS

| | | |
|---|---|---|
| CN | 102360717 A | 2/2012 |
| CN | 102 387 996 A | 3/2012 |
| CN | 202 358 950 U | 8/2012 |
| JP | 2003 340459 A | 12/2003 |
| JP | 2004 017022 A | 1/2004 |
| WO | WO 92/18223 A1 | 10/1992 |
| WO | WO 00/03951 A1 | 1/2000 |
| WO | WO 2013/018236 A1 | 2/2013 |
| WO | WO 2014152920 A1 * | 9/2014 ............. F28F 19/01 |

OTHER PUBLICATIONS

International Search Report and Written Opinion from International Application No. PCT/US2014/027749 dated Jun. 25, 2014.
Office Action from corresponding European Patent Application No. 14725278.7 dated Aug. 4, 2016.
Office Action from corresponding Canadian Patent Application No. 2,906,687 dated Oct. 4, 2016.
European Office Action for EP Application No. 14 725 278.7 dated Mar. 17, 2017.

* cited by examiner

APPARATUS AND METHOD FOR APPLYING MAGNETIC FIELDS TO FLUID FLOWS

CROSS-REFERENCE TO RELATED APPLICATIONS

This application claims the benefit of U.S. Provisional Application No. 61/781,898 entitled "Apparatus and Method for Applying Magnetic Fields to Fluid Flows," filed Mar. 14, 2013, the contents of which are incorporated herein in their entirety.

FIELD OF THE INVENTION

Embodiments of the present invention relate to an apparatus and method for applying a magnetic field to portions of a fluid purification system, such as a water purification system.

BACKGROUND

The earth's water supply has many uses. Potable water is necessary for human consumption and food preparation. Water is also important for agricultural purposes, such as for the irrigation of crops and raising livestock, as well as for industrial purposes.

Cooling water systems are often used, for example, in power plants, petroleum refineries, petrochemical plants, natural gas processing plants, food processing plants, semiconductor manufacturing facilities, and other industrial facilities as a way to regulate equipment and/or process temperatures, such as in condensers of distillation columns, for cooling liquid in crystallization, etc. In removing heat, however, the water itself becomes hot and cannot be safely reintroduced into the environment or put back into the cooling system without the excess heat being removed.

As a result, industrial cooling towers can be used to remove such heat from the circulating cooling water (or other cooling fluid). Certain contaminants found in water may, however, create deposits in piping and/or on portions of expensive equipment and decrease equipment efficiency and/or cause premature failure of the equipment. Moreover, cooling towers can vary in size depending on the amount of fluid that needs to be cooled, the amount of heat that is to be removed, the flow rate of the fluid, etc.

Accordingly, there is a need for facilitating and improving the purification of fluids such as water in different types of industrial and other facilities for both new and existing systems in a simple, practical, and cost-efficient manner.

SUMMARY

The present invention provides devices and methods for in-line water treatment using strong magnetic fields to influence corrosion, separate toxins, suppress bacteria and bio-fouling, as well as inhibit or greatly reduce mineral scaling due to fluid flow in or around equipment components. In one embodiment an apparatus is provided for applying a magnetic field comprising a plurality of magnetic links, each link being pivotally joined to two adjacent links so as to form a circumferentially continuous link arrangement that is configured to be disposed about an outer surface of a portion of tubing through which a fluid flow is conveyed. Each link is configured to direct a magnetic field toward a region within the portion of tubing, and a combined magnetic field created within the region is configured to increase magnetic flux and flux variation to promote precipitation of particles within the fluid flow conveyed therethrough such that the particles are carried downstream of the region by the fluid flow.

In some embodiments, each link comprises a housing and at least one magnet supported within the housing. In some embodiments, each link has a different magnetic orientation than each of the two respective adjacent links. In some embodiments, each link has substantially the same magnetic orientation as each of the two respective adjacent links. In some embodiments, the at least one magnet comprises an array of magnets, and each magnet of the array of magnets has a different magnetic orientation than at least one respective adjacent magnet within the array of magnets.

In some embodiments, a pivoting connection between at least two adjacent links is configured to be detachable. In some embodiments, at least one of the links is removable, and a remainder of the links is configured to be re-joined upon removal of the removable link so as to form a smaller diameter circumferentially continuous link arrangement. In some embodiments, the links are configured to accommodate and be joined with at least one additional link upon detachment of the pivoting connection so as to form a larger diameter circumferentially continuous link arrangement. In some embodiments, the apparatus comprises between 4 and 20 links. In some embodiments, the apparatus is configured to be disposed about an outer surface of a portion of tubing in a cooling tower.

In another embodiment, a magnetic link is provided that is configured to be joined to adjacent links so as to form a circumferentially continuous link arrangement, wherein the link arrangement is configured to be disposed about an outer surface of a portion of tubing through which a fluid flow is conveyed. The link comprises a housing, and at least one magnet supported within the housing configured to direct a magnetic field toward a region within the portion of tubing. The magnetic field of the link is configured to combine with magnetic fields of other links of the link arrangement so as to create a combined magnetic field within the region that is configured to increase magnetic flux and flux variation to promote precipitation of particles within the fluid flow conveyed therethrough such that the particles are carried downstream of the region by the fluid flow.

Some embodiments further comprise at least one magnetic backiron supported within the housing and configured to limit a magnetic flux through an exterior surface of the link. In some embodiments, the housing defines first and second hinge portions, wherein the first hinge portion of the link is configured to be joined to the second hinge portion of a first adjacent link, and the second hinge portion of the link is configured to be joined to the first hinge portion of a second adjacent link. Some embodiments further comprise a pin member configured to join at least one of the first or second hinge portions to a corresponding second or first hinge portion of the respective first or second adjacent links together. In some embodiments, the housing comprises a body portion and a cover. In some embodiments, the housing is made of aluminum.

In another embodiment, a method is provided of applying a magnetic field to a region within a portion of tubing through which a fluid flow is conveyed. The method comprises supporting at least one magnet within a housing of a magnetic link, joining a plurality of links together, disposing the joined plurality of links about an outer surface of a portion of tubing through which a fluid flow is conveyed, and joining end links of the joined plurality of links to each other so as to form a circumferentially continuous link arrangement. Each link is configured to direct a magnetic field toward a region within the portion of tubing, and a combined magnetic field created within the region is configured to increase magnetic flux and flux variation to promote precipitation of particles within the fluid flow conveyed therethrough such that the particles are carried downstream of the region by the fluid flow.

In some embodiments, joining a plurality of links comprises selecting links such that each link has a different magnetic orientation than each of the two respective adjacent links. In some embodiments, joining a plurality of links comprises selecting links such that each link has substantially the same magnetic orientation as each of the two respective adjacent links. Some embodiments further comprise detaching a pivoting connection between at least two adjacent links and adjusting a diameter of the circumferentially continuous link arrangement through removal or addition of at least one link.

BRIEF DESCRIPTION OF THE DRAWINGS

Figure 1:
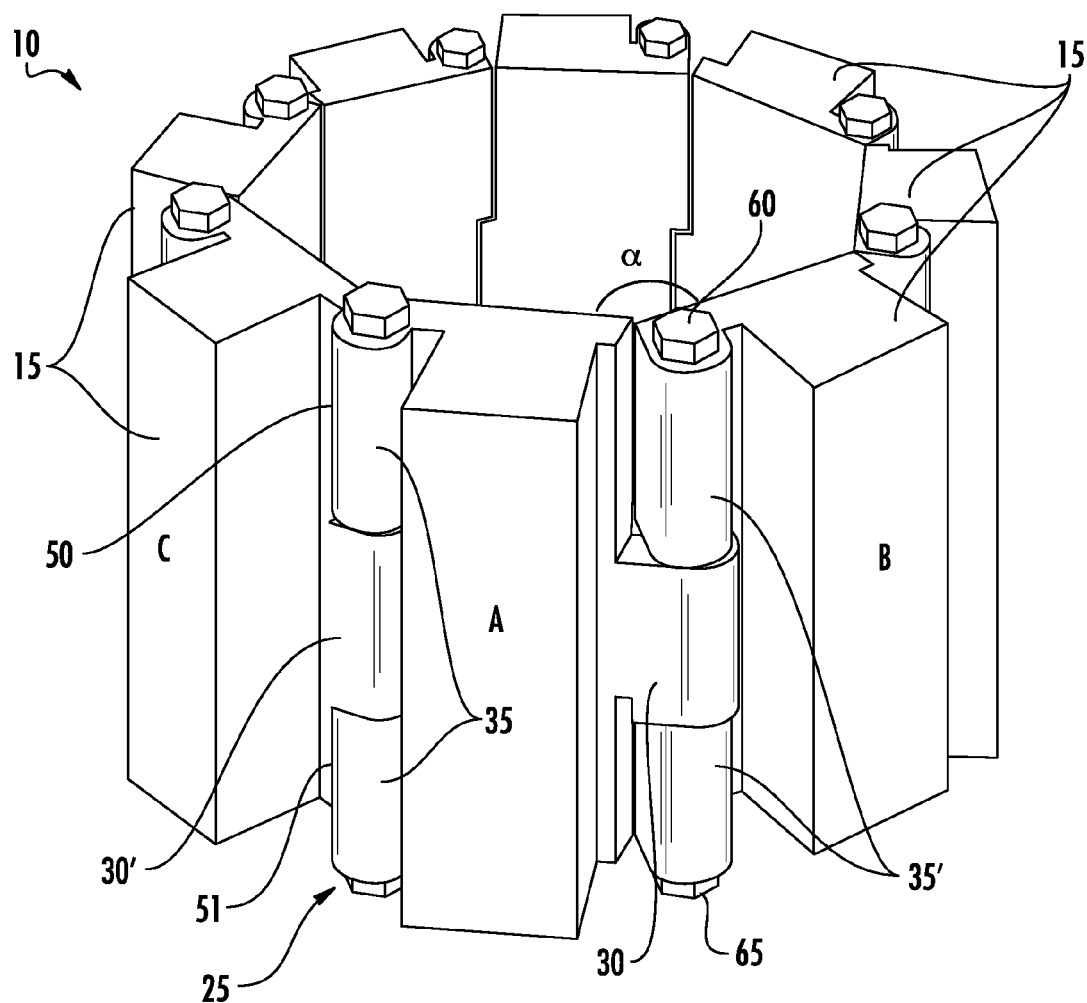
Figure 2:
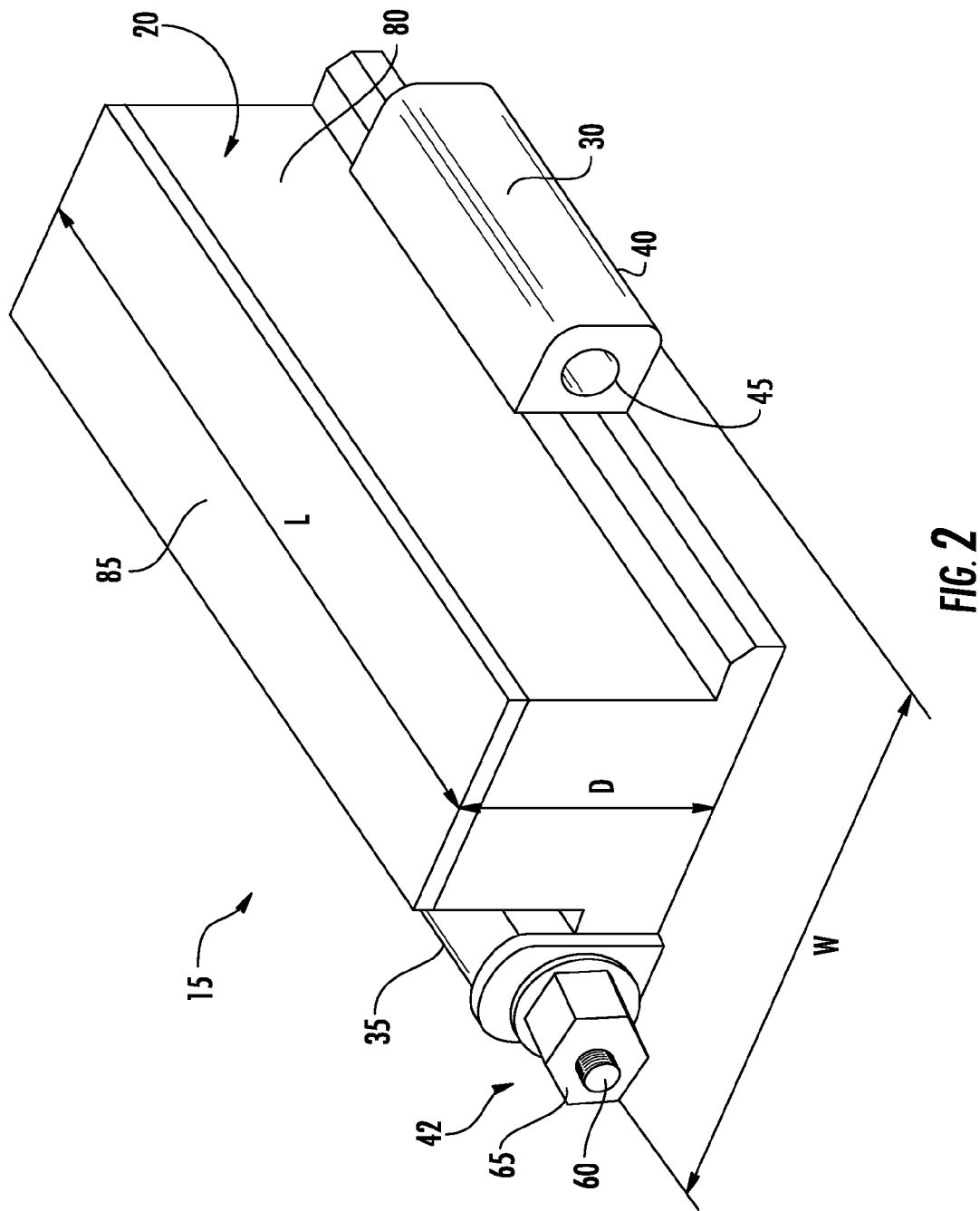
Figure 3:
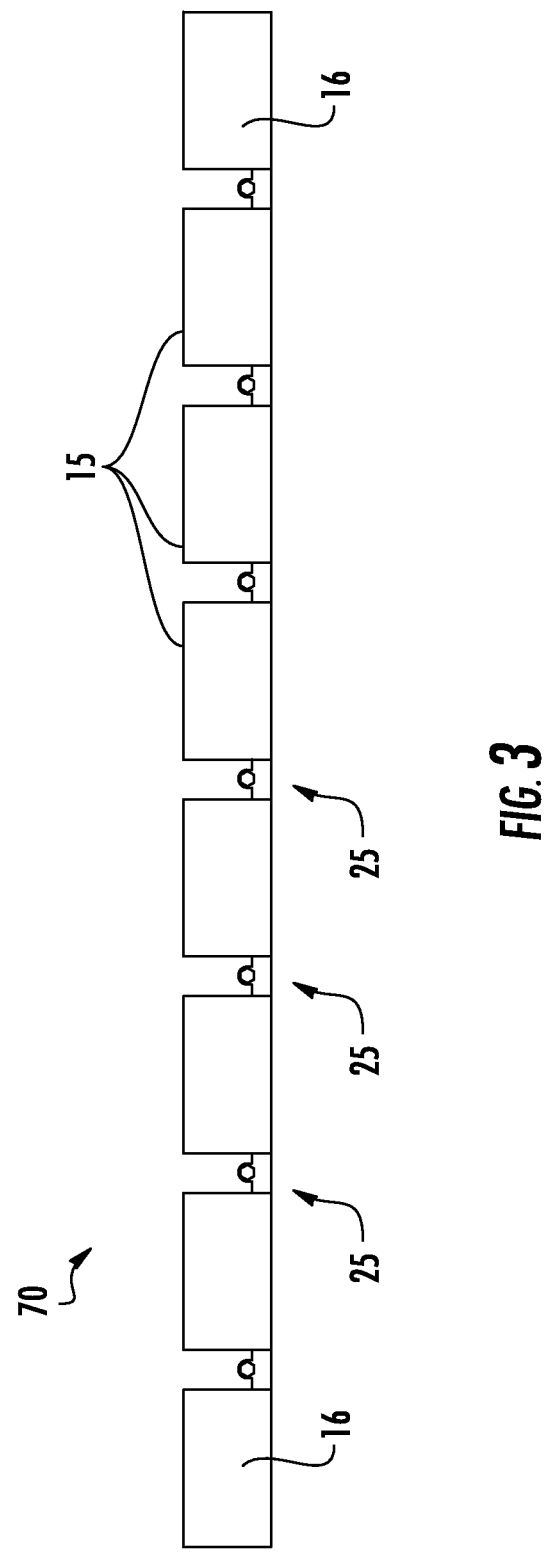
Figure 4:
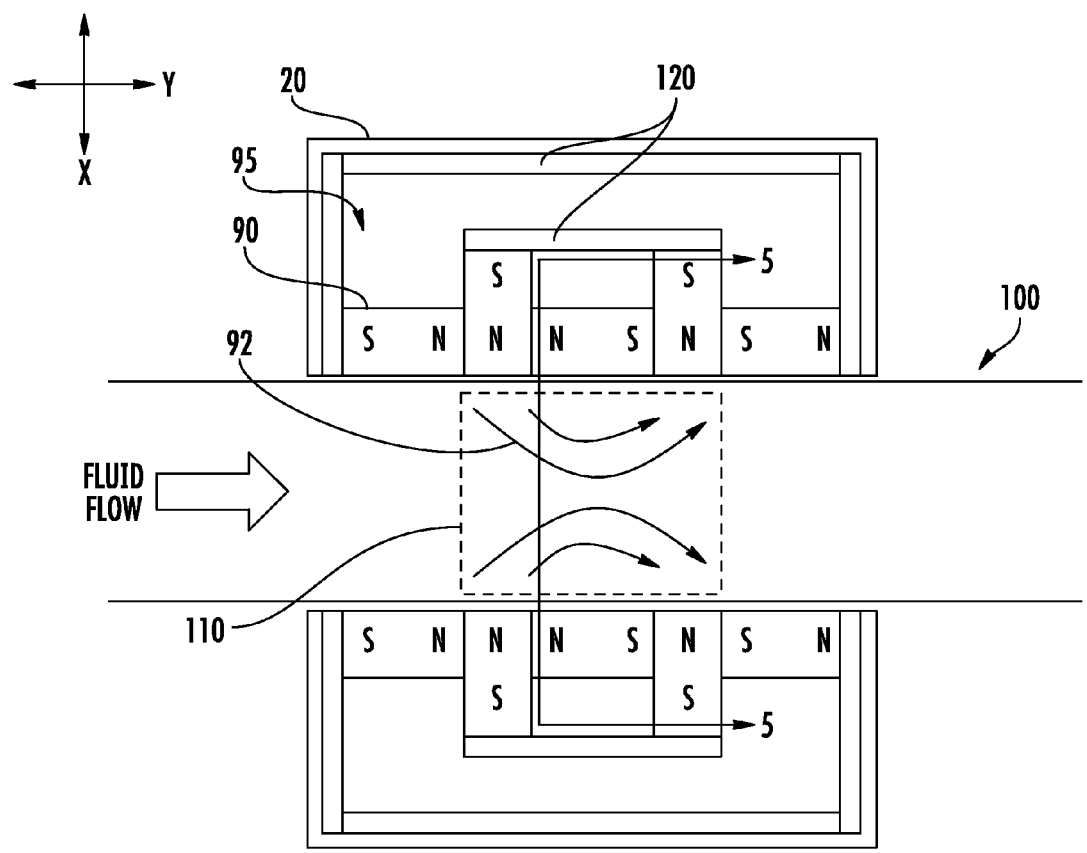
Figure 5:
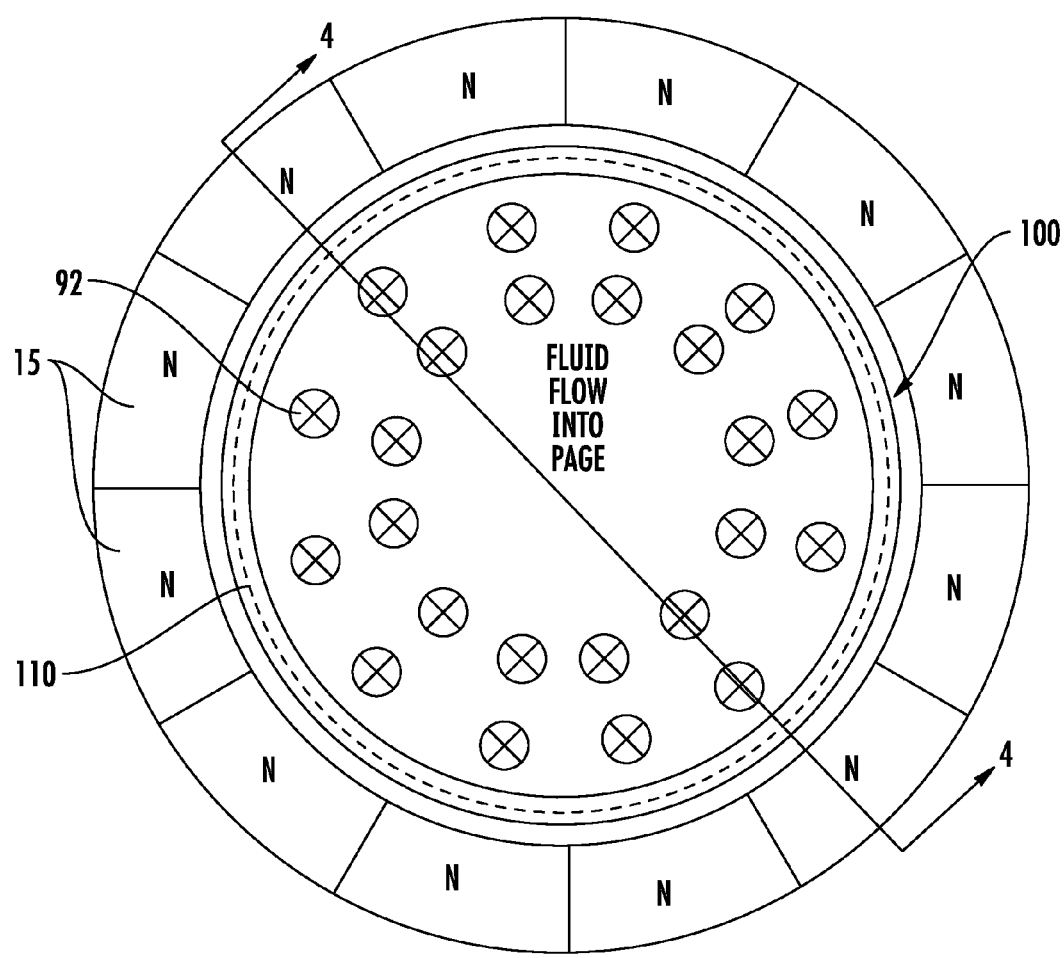
Figure 6:
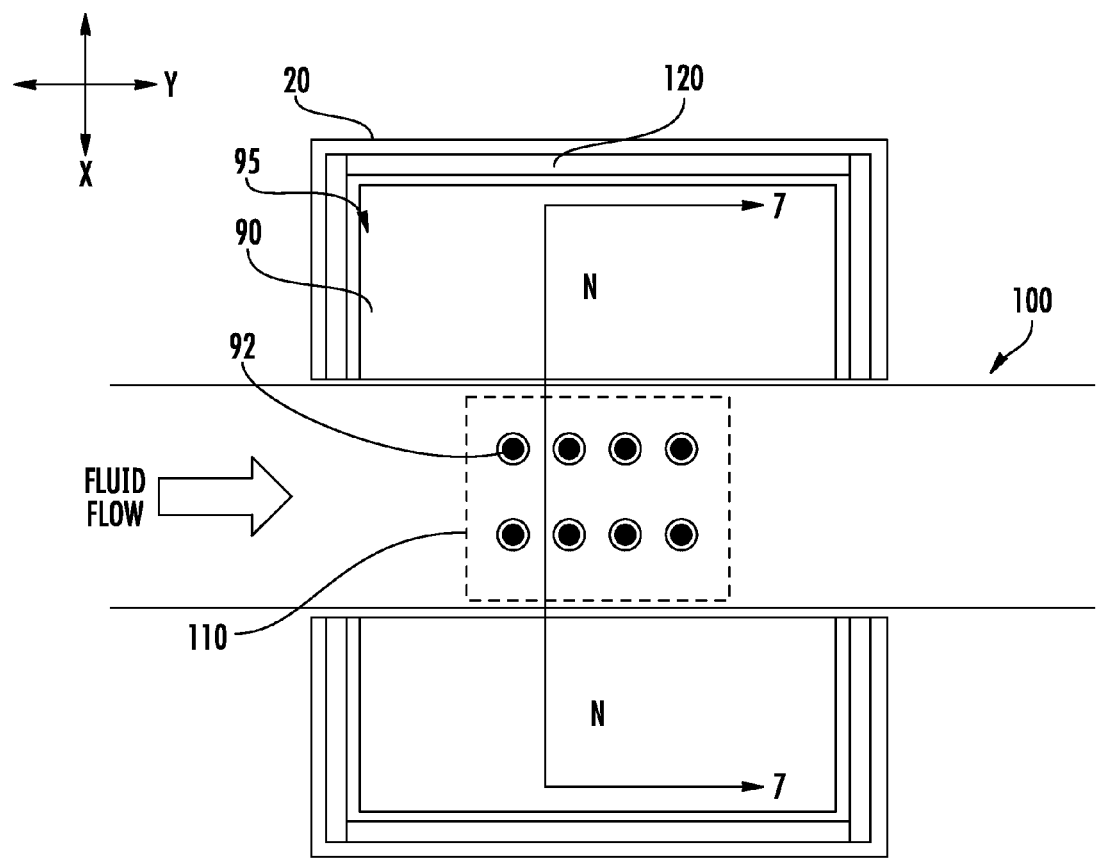
Figure 7:
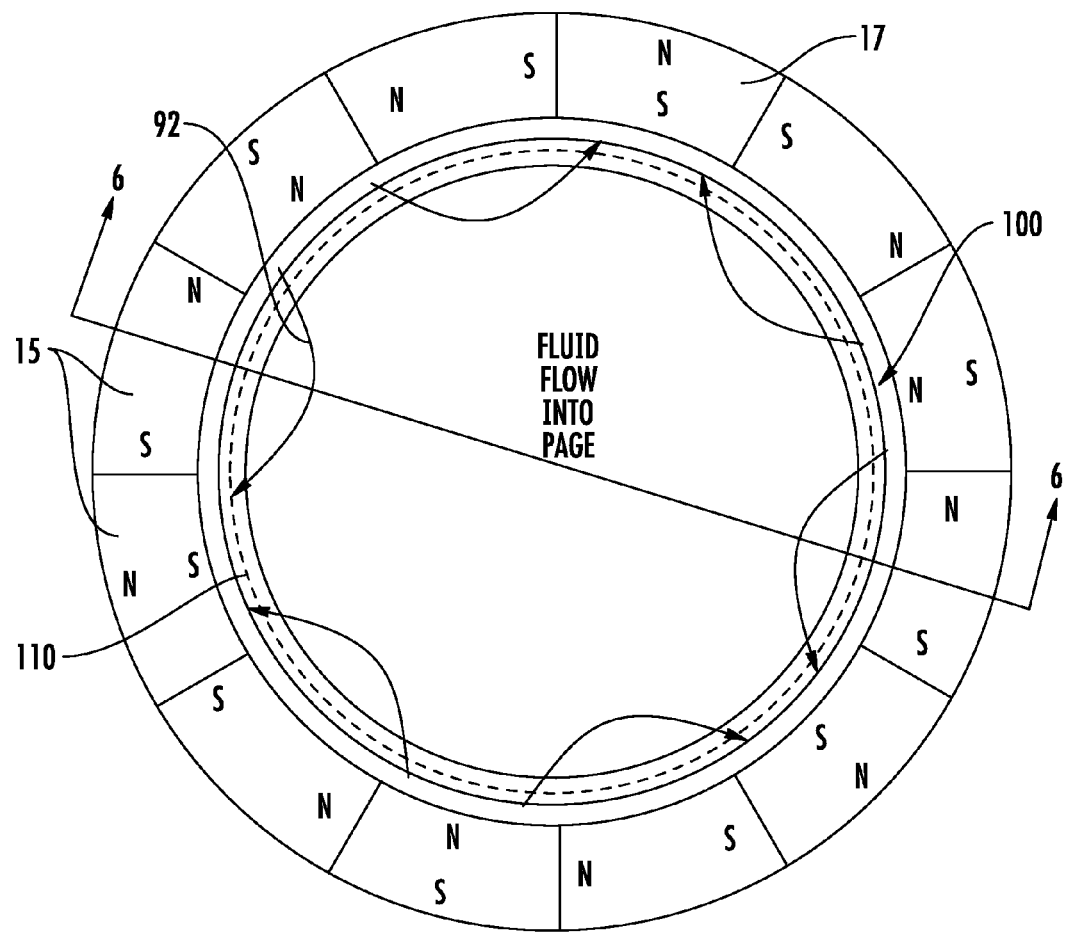
Figure 8:
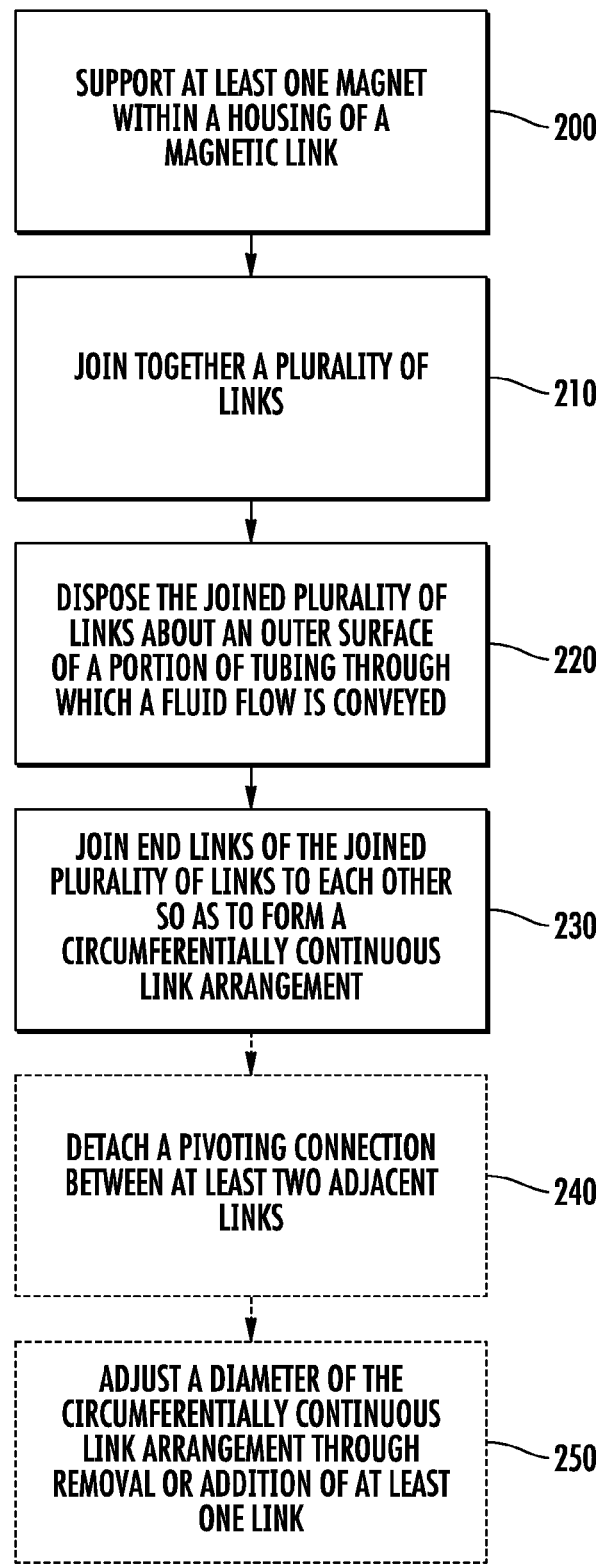

Having thus described the invention in general terms, reference will now be made to the accompanying drawings, which are not necessarily drawn to scale, and wherein:

FIG. 1 is a perspective view of a device according to example embodiments of the present invention;

FIG. 2 is a perspective view of a link of the device of FIG. 1 according to example embodiments of the present invention;

FIG. 3 is a schematic illustration of a line of links prior to forming a circumferentially continuous link arrangement according to example embodiments of the present invention;

FIG. 4 is an axial cross-sectional view of the device simplified to illustrate the resulting magnetic fields according to example embodiments of the present invention;

FIG. 5 is a transverse cross-sectional view of the device of FIG. 4 according to another example embodiments of the present invention;

FIG. 6 is an axial cross-sectional view of the device simplified to illustrate the resulting magnetic fields according to example embodiments of the present invention;

FIG. 7 is a transverse cross-sectional view of the device of FIG. 6 according to example embodiments of the present invention; and FIG. 8 illustrates a flow chart of a method of applying a magnetic field to a region within a portion of tubing according to example embodiments of the present invention.

DETAILED DESCRIPTION

Embodiments of the present inventions now will be described more fully hereinafter with reference to the accompanying drawings, in which some, but not all embodiments of the inventions are shown. Indeed, embodiments of these inventions may be embodied in many different forms and should not be construed as limited to the embodiments set forth herein; rather, these embodiments are provided so that this disclosure will satisfy applicable legal requirements. Like reference numerals refer to like elements throughout.

The terms top, bottom, side, up, down, upwards, downwards, vertical, horizontal, and the like, to the extent used herein, do not imply a required limitation in all embodiments of the present invention, but rather are used herein to help describe relative direction or orientation in the example embodiments illustrated in the figures. Moreover, although water is used as an exemplary fluid in the description that follows, it is to be understood that embodiments of the invention may be applicable to other fluids, as well.

Fluids such as water are important tools of industry. In some cases, a fluid may be used for operating machinery and equipment. For example, fluids may be used to transmit power, cut material, lubricate, dampen, convey, etc. Fluids, such as water, can also be useful for dissipating excess heat that is produced as a byproduct in various industrial applications and manufacturing processes, such as in power plants, petroleum refineries, petrochemical plants, natural gas processing plants, food processing plants, semi-conductor manufacturing facilities, and other industrial facilities.

Taking the example of water, the efficiency and proper functioning of equipment is often dependent on the quality of the water that used (e.g., to cool the equipment). Although water used for such industrial processes need not be fit for human consumption, the presence of some contaminants, and in particular certain types of contaminants, may cause equipment to slow down, malfunction, or produce other undesirable results.

In industrial cooling towers, for example, mineral scaling, corrosion, and bacterial effects may be caused by certain contaminants carried in the water and may have an adverse impact on the operation of some equipment. As a result of such problems, operations often need to be halted while parts are replaced, cleaned out, or otherwise repaired, costing significant amounts of money.

Accordingly, embodiments of the present invention provide devices for in-line water treatment using strong magnetic fields to influence corrosion, separate toxins, suppress bacteria and bio-fouling, as well as inhibit or greatly reduce mineral scaling due to fluid flow in or around equipment components. The use of magnetic treatment of fluids such as water may allow extended cycles of operation with higher concentration of mineral salts without the use of chemical scaling suppressants (which may themselves be considered contaminants, such as when the water is treated for reintroduction into the environment). As a result, the frequency, volume, toxicity, disposal efforts, and down time associated with particular processes (such as cooling tower blow down) as well as the chemical usage costs may be significantly reduced.

Turning to FIG. 1, a device 10 is provided for applying a magnetic field to a portion of tubing through which a fluid flow (e.g., a flow of water) is conveyed. In this regard, the term "tubing" as used herein refers to any component through which a fluid flows, such as a part of a machine or piece of equipment, piping, joint, etc. For ease of explanation, the examples that follow and the associated figures refer to a portion of tubing that is a straight piece of cylindrical piping.

The device 10 may include a plurality of magnetic links 15. In the depicted embodiment of FIG. 1, for example, the device 10 includes eight links 15. In other embodiments, however, the device may include any number of links, for example three to twenty links, or more, depending on the diameter of the portion of tubing for which the device is intended, as described in greater detail below.

Each link 15 may be pivotally joined to two adjacent links so as to form a circumferentially continuous link arrangement (e.g., a closed loop) that is configured to be disposed about an outer surface of a portion of tubing through which a fluid flow is conveyed (e.g., to surround the portion of tubing). Thus, for example, a device 10 having eight links 15 would be configured to accommodate a larger diameter portion of tubing than a device having only five links, but the device having eight links would accommodate a smaller diameter portion of tubing as compared to a device having twelve links (where the links have the same dimensions).

A single link 15 is shown in FIG. 2. With reference to FIG. 2, each magnetic link 15 may include a housing 20 and at least one magnet (shown in FIGS. 4-7) supported within the housing that is configured to direct a magnetic field toward a region within a portion of tubing, as described in greater detail below. Although the links may be joined to form a circumferentially continuous link arrangement (shown in FIG. 1) in a number of ways, in an exemplary embodiment, each link 15 is configured to be pivotally joined to the respective adjacent links. Thus, for example, when only two links 15 are joined together, the two links may be able to pivot with respect to each other about a single pivoting connection 25 (shown in FIG. 1). In this case, each link 15 may be considered an end link (e.g., because it is only joined to one adjacent link), and the links in this example are incapable of forming a circumferentially continuous link arrangement.

When three links 15 are joined together via two pivoting connections 25, two of the links may be considered end links (e.g., the two links that are disposed on opposite sides of an intermediate link and are, thus, only joined to one adjacent link). The intermediate link in this case is not considered an end link because it is joined to two adjacent links and has no free edge via which it may be joined to another link. In this case, joining the end links (e.g., the first and third links) to each other may serve to form the circumferentially continuous link arrangement. FIG. 3, for example, shows eight links 15 joined together, with two end links 16 and six intermediate links between the two end links.

Accordingly, in some embodiments, the device 10 may be formed by joining a number of links 15 together, where the number of links is selected based on the dimensions of the links and the diameter of the portion of tubing about which the device is to be disposed. For example, each link may define a width W, a depth D, and a length L, illustrated in FIG. 2. The number of links 15 may be selected such that the sum of the widths W of the links is greater than the circumference of the portion of tubing (circumference being related to diameter by the equation π×d, where d is diameter). In an example embodiment, the width W of a link is between 1 inch and 3 inches, such as 1.5 inches. It is noted, however, that the fewer the number of links 15 in the device 10, the more angular the device, and the less "circular" the cross-section of the circumferentially continuous link arrangement. For example, when three links are used, a cross-section of the circumferentially continuous link arrangement will look more an equilateral triangle, whereas when eight links are used (such as in FIG. 1), the more rounded the device will be as the internal angle α between adjacent links 15 (shown in FIG. 2) will be greater.

With reference to FIGS. 1 and 2, each link 15 may define a first hinge portion 30 and a second hinge portion 35. The first hinge portion 30 of the link 15 (labeled as "A" in FIG. 1 for explanatory purposes) may be configured to be joined to the second hinge portion 35' of a first adjacent link B, whereas the second hinge portion 35 of the link A may be configured to be joined to the first hinge portion 30' of a second adjacent link C. For example, as shown in FIGS. 1 and 2, the first hinge portion 30 may comprise a single pin receiving extension 40 that defines a channel 45, through which a pin member 42 may extend, whereas the second hinge portion 35 may comprise two pin receiving extensions 50, 51 (shown in FIG. 1) that are spaced apart so as to receive the pin receiving extension 40 of the mating first hinge portion 30 therebetween. The pin receiving extensions 50, 51 of the second hinge portion 35 may thus also each define a channel (not shown) the channels being aligned with each other and with the channel 45 of the pin receiving extension 40 of the first hinge portion 30 such that the same pin member that is received in the mating pin receiving extension may be received therethrough. In this way, the links may be keyed such that a link 15 may only be joined to another link in a certain orientation (e.g., first hinge portions cannot be mated to each other).

Accordingly, in some embodiments, each link 15 may further comprise a pin member 42 that is configured to join at least one of the first or second hinge portions 30, to a corresponding second or first hinge portion of the respective first or second adjacent links together. The pin member 42 may comprise, for example, a bolt 60 and a fastener 65 (e.g., a nut and a washer), as depicted, where the bolt may be passed through the aligned channels of mating pin receiving extensions and the fastener may be threaded or otherwise attached to an end of the bolt to secure the bolt within the channel and thereby maintain the mating first and second hinge portions 30, 35 in engagement, while still permitting the joined links to pivot with respect to one another (at least prior to the circumferentially continuous link arrangement being formed).

Once the desired number of links 15 are joined together to form a line 70 of links, as depicted in FIG. 3, the joined plurality of links may be disposed about an outer surface of a portion of tubing through which a fluid flow is conveyed. End links 16, as described above, may then be joined to each other so as to form a circumferentially continuous link arrangement, such as the arrangement illustrated in FIG. 1.

As noted above, each link 15 may be configured to direct a magnetic field toward a region within the portion of tubing about which the device 10 is disposed. A combined magnetic field may thus be created within the region (e.g., as a result of the superimposition of the individual magnetic fields from each joined link), and the combined magnetic field may be configured to increase magnetic flux and flux variation to promote the precipitation of particles within the fluid flow passing therethrough such that the particles are carried downstream of the region by the fluid flow.

In particular, in some embodiments, with reference to FIG. 2, the housing 20 of each link 15 may include a body portion 80 and a cover 85. The housing 20, including the body portion 80 and/or the cover 85, may, for example, be made of aluminum, austenitic (300 series) stainless steel, or any other material suitable for use in an industrial environment and that is not affected by or exhibits very low response to magnetism. In some embodiments, the housing may be hermetically sealed, which may, in some cases, prevent deterioration of inner magnets over long operation times.

The body portion 80 of the housing 20 of each link 15 may define a cavity 95 (shown in FIG. 4) within which one or more magnets may be arranged. In some cases, each link 15 of the device 10 may have substantially the same magnetic orientation as each of the two respective adjacent links. Turning to FIG. 4, for example, in some embodiments, the at least one magnet comprises an array of magnets 90, such that the housing 20 is configured to support an array of magnets within the cavity 95 of the body portion. Moreover, each magnet 90 of the array of magnets may have a different magnetic orientation (e.g., polarity) than at least one respective adjacent magnet within the array of magnets. In FIG. 4, for example, the array of magnets includes five magnets 90, and the polarity of each magnet is off-phase from the next adjacent magnet by 90°. Thus, the left-most magnet in FIG.

4 has a South (S)-North (N) polarity from right to left along the x-axis. The next magnet (to the right) has poles that are rotated 90° clockwise with respect to the left-most magnet and thus has a S-N polarity along the y-axis from top to bottom. The next magnet (middle) is oriented along the x-axis and has a polarity of N-S from right to left; the magnet to the right of that one is oriented along the y-axis and has a polarity of N-S from top to bottom; and the right-most magnet is oriented along the x-axis and has a polarity of S-N from right to left.

In the depicted embodiment of FIG. 4, the array of magnets 90 within each link may be considered a Halbach array that produces a concentrated magnetic field (represented by arrows 92) in the direction of the portion of tubing 100 about which the device is disposed, as shown. Due to the 90° phase shift between the magnets in each link, however, the magnetic field on an opposite side of the device from the tubing (the cover side of the device) may be substantially canceled out. In particular, the magnetic field 92 is amplified and directed toward a region 110 (shown using dashed lines in the figures) within the portion of tubing 100 through which the fluid flow is conveyed. A cross-sectional view of the device 10 disposed about the portion of tubing 100 of FIG. 4 is shown in FIG. 5, in which the fluid flow is conveyed in a direction into the page. The effect of the magnetic field on the fluid and, more particularly, different contaminants that may be carried by the fluid, is described in greater detail below.

Referring again to FIG. 4, in some embodiments, the housing 20 of each link may include one or more magnetic backirons 120 placed on either side and behind (with respect to the direction of the magnetic field towards the region 110) the magnets 90. The magnetic backirons 120 may be configured to further limit the magnetic flux passing through the sides and back surface (e.g., cover 85) of each link 15 and may, in some cases, further direct the magnetic field toward the region 110 through which the fluid flow passes. In some embodiments, the backirons may be made of a magnetic metal, such as magnetic steel or iron alloy.

In FIGS. 6 and 7, a device incorporating another configuration of a Halbach array is shown. Accordingly, in some embodiments, each link 15 of the device may include a single magnet or may include an array of magnets arranged such that they create within the link a single magnetic orientation. The Halbach array may nonetheless be created by the device as a whole due to a 90° phase shift from one link to the next. In this regard, each link 15 may be configured to have a different magnetic orientation than each of the two respective adjacent links, as shown in FIG. 7. For example, starting at the top of the device in FIG. 7 and working clockwise, a first link 17 may have a polarity of N-S from top to bottom. The next link 15 in the clockwise direction may have a polarity of S-N from left to right (with respect to the link orientation), whereas the next link may have a polarity of S-N from top to bottom, and so on. As described above with respect to FIGS. 4 and 5, the Halbach configuration of the links 15 may direct a combined magnetic field toward the region 110, such that precipitation of particles within the fluid flow is promoted and the precipitated particles may be carried downstream for removal, such as via filtration.

In particular, water with dissolved salts has ions that give the liquid a non-zero electrical conductivity. Even pure water has some population of Hydrogen (H+) and hydroxyl (OH−) ions that are naturally occurring. These ions may react to strong magnetic fields such that positive and negative ions are pushed in opposite directions, leading to charge separation and electric current flow in the water. The stronger the magnetic field or the higher the water flow velocity, the stronger the magnetohydrodynamic effect.

The inventor has discovered evidence that water flows are affected by the magnetic field in such a way as to promote the precipitation of minerals into the bulk of the flow. These precipitates may then be transported with the fluid flow downstream of the region of the magnetic field, rather than be deposited on the pipe and equipment component walls. Moreover, the precipitates may be removed from the fluid flow via filtration systems downstream or, in some cases, may settle out of the main flow of fluid in a controlled manner (e.g., at predefined settler plates) and may thus be disposed of during cooling water blow down periods. In addition, the inventor has identified that even low level electric fields created by the movement of the conducting liquid through the magnetic field may act to inhibit the growth of bacteria (e.g., legionella) and algae that, in some cases, lead to biofilms on equipment walls (e.g., heat transfer surfaces) and can be destructive.

In an example embodiment, rare-earth magnets may be used within the links to create the magnetic fields described above. In one example, each link in a device may be configured to have a magnetic flux density of approximately 6,200 Gauss, or more. It is to be understood, however, that other types of magnets, including electromagnets, may be used to create the magnetic fields for promoting precipitation of contaminants. Moreover, various factors may affect the strength of the magnetic field that is required, such as the flow rate of the fluid, the material and dimensions of the piping and equipment through which the fluid is flowing, the acidity of the fluid, the type of contaminants present, and the concentration of contaminants in the fluid, to name a few.

As noted above, embodiments of the device 10 described herein are configured to be used in both new industrial installations and on existing equipment, such as via retrofitting. In this regard, referring again to FIGS. 1 and 2, a pivoting connection 25 between at least two adjacent links 15 may be configured to be detachable. For example, in some cases, at least one of the links 15 may be removable, and a remainder of the links may be configured to be re-joined upon removal of the removable link so as to form a smaller diameter circumferentially continuous link arrangement. Similarly, in other cases, the links 15 may be configured to accommodate and be joined with at least one additional link upon detachment of the pivoting connection 25 so as to form a larger diameter circumferentially continuous link arrangement. In this way, detaching a pivoting connection 25 between at least two adjacent links 15 may allow a user to adjust a diameter of the circumferentially continuous link arrangement through the removal or addition of at least one link 15, such that the device 10 may be used on larger or smaller diameter tubing portions, as necessary, without the need for an entirely new device.

Turning now to FIG. 8, a flow chart illustrating a method of applying a magnetic field to a region within a portion of tubing through which a fluid flow is conveyed is shown. As described above with respect to FIGS. 1-7, at least one magnet may be supported within a housing of a magnetic link at Block 200. A plurality of links may then be joined together at Block 210, and the joined plurality of links may be disposed about an outer surface of a portion of tubing through which a fluid flow is conveyed at Block 220. End links of the joined plurality of links may be joined to each other so as to form a circumferentially continuous link arrangement that surrounds the portion of tubing, as described above, at Block 230. Each link may thus be configured to direct a magnetic field toward a region within the portion of tubing, and a combined magnetic field created within the region may be configured to increase magnetic flux and flux variation to promote precipitation of particles within the fluid flow conveyed therethrough such that the particles are carried downstream of the region by the fluid flow.

In some embodiments, as described above with respect to FIGS. 4-7, the links may be selected such that each link has a different magnetic orientation than each of the two respective adjacent links. In still other embodiments, links may be selected such that each link has substantially the same magnetic orientation as each of the two respective adjacent links. Moreover, a pivoting connection between at least two adjacent links may be detached at Block 240, and a diameter of the circumferentially continuous link arrangement may be adjusted through removal or addition of at least one link at Block 250, as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus for applying a magnetic field comprising a plurality of magnetic links, each link being pivotally joined to two adjacent links so as to form a circumferentially continuous adjustable link arrangement that is configured to be disposed about an outer surface of a portion of tubing through which a fluid flow is conveyed,
    wherein each link is configured to direct a magnetic field toward a region within the portion of tubing,
    wherein each link has a different magnetic orientation than each of the two respective adjacent links, such that the magnetic orientation of each link is rotated by 90° with respect to adjacent links,
    wherein the link arrangement is configured to be adjusted via addition or removal of at least one magnetic link, and
    wherein a combined magnetic field created within the region is configured to increase magnetic flux and flux variation to suppress bacteria and promote precipitation of particles currently within the fluid flow conveyed therethrough such that the particles are carried downstream of the region by the fluid flow.

2. The apparatus of claim 1, wherein each link comprises a housing and at least one magnet supported within the housing.

3. The apparatus of claim 2, wherein the at least one magnet comprises an array of magnets, and wherein each magnet of the array of magnets has a different magnetic orientation than at least one respective adjacent magnet within the array of magnets.

4. The apparatus of claim 1, wherein a pivoting connection between at least two adjacent links is configured to be detachable.

5. The apparatus of claim 4, wherein at least one of the links is removable, and wherein a remainder of the links is configured to be re-joined upon removal of the removable link so as to form a smaller diameter circumferentially continuous link arrangement.

6. The apparatus of claim 4, wherein the links are configured to accommodate and be joined with at least one additional link upon detachment of the pivoting connection so as to form a larger diameter circumferentially continuous link arrangement.

7. The apparatus of claim 1, wherein the apparatus comprises between 4 and 20 links.

8. The apparatus of claim 1, wherein the apparatus is configured to be disposed about an outer surface of a portion of tubing in a cooling tower.

9. A magnetic link configured to be joined to adjacent links so as to form a circumferentially adjustable continuous link arrangement, wherein the link arrangement is configured to be disposed about an outer surface of a portion of tubing through which a fluid flow is conveyed, wherein the link comprises:
    a housing; and
    at least one magnet supported within the housing configured to direct a magnetic field toward a region within the portion of tubing,
    wherein the link is configured to be added to a link arrangement or removed from the link arrangement to adjust a size of the link arrangement, wherein each link in the link arrangement has a different magnetic orientation than each of the two respective adjacent links, such that the magnetic orientation of each link is rotated by 90° with respect to adjacent links, and
    wherein the magnetic field of the link is configured to combine with magnetic fields of other links of the link arrangement so as to create a combined magnetic field within the region that is configured to increase magnetic flux and flux variation to suppress bacteria and promote precipitation of particles currently within the fluid flow conveyed therethrough such that the particles are carried downstream of the region by the fluid flow.

10. The magnetic link of claim 9, further comprising at least one magnetic backiron supported within the housing and configured to limit a magnetic flux through an exterior surface of the link.

11. The magnetic link of claim 9, wherein the housing defines first and second hinge portions, wherein the first hinge portion of the link is configured to be joined to the second hinge portion of a first adjacent link, and the second hinge portion of the link is configured to be joined to the first hinge portion of a second adjacent link.

12. The magnetic link of claim 11 further comprising a pin member configured to join at least one of the first or second hinge portions to a corresponding second or first hinge portion of the respective first or second adjacent links together.

13. The magnetic link of claim 9, wherein the housing comprises a body portion and a cover.

14. The magnetic link of claim 9, wherein the housing is made of aluminum.

15. A method of applying a magnetic field to a region within a portion of tubing through which a fluid flow is conveyed comprising:
- supporting at least one magnet within a housing of a magnetic link;
- joining a plurality of links together;
- disposing the joined plurality of links about an outer surface of a portion of tubing through which a fluid flow is conveyed; and
- joining end links of the joined plurality of links to each other so as to form a circumferentially continuous and adjustable link arrangement,
- wherein each link has a different magnetic orientation than each of the two respective adjacent links, such that the magnetic orientation of each link is rotated by 90° with respect to adjacent links,
- wherein each link is configured to direct a magnetic field toward a region within the portion of tubing and is further configured to be added to the link arrangement or removed from the link arrangement to adjust a size of the link arrangement, and
- wherein a combined magnetic field created within the region is configured to increase magnetic flux and flux variation to suppress bacteria and promote precipitation of particles currently within the fluid flow conveyed therethrough such that the particles are carried downstream of the region by the fluid flow.

16. The method of claim 15 further comprising detaching a pivoting connection between at least two adjacent links and adjusting a diameter of the circumferentially continuous link arrangement through removal or addition of at least one link.

* * * * *